United States Patent [19]  [11] 3,999,997
Faulstich et al.  [45] Dec. 28, 1976

[54] OPTICAL GLASS

[75] Inventors: Marga Faulstich, Mainz; Franz Reitmayer, Drais, both of Germany

[73] Assignee: Jenaer Glaswerk Schott & Gen., Mainz, Germany

[22] Filed: July 22, 1975

[21] Appl. No.: 598,347

[30] Foreign Application Priority Data

July 24, 1974  Germany .......................... 2435553

[52] U.S. Cl. ................................. 106/54; 106/47 Q
[51] Int. Cl.$^2$ ...................... C03C 3/08; C03C 3/10
[58] Field of Search ..................... 106/47 Q, 54

[56] References Cited

UNITED STATES PATENTS

| | | | |
|---|---|---|---|
| 3,100,714 | 8/1963 | Bromer et al. | 106/54 |
| 3,266,916 | 8/1966 | Bromer et al. | 106/54 |
| 3,513,004 | 5/1970 | Kohut et al. | 106/54 |
| 3,536,504 | 10/1970 | Faulstich et al. | 106/54 |
| 3,716,385 | 2/1973 | Ritze | 106/54 |
| 3,877,953 | 4/1975 | Broemer et al. | 106/54 |

*Primary Examiner*—Winston A. Douglas
*Assistant Examiner*—Mark Bell
*Attorney, Agent, or Firm*—Millen, Raptes & White

[57] ABSTRACT

Optical glass with a path length independent of temperature includes $SiO_2$, $B_2O_3$, $K_2O$, BaO, $ZrO_2$, $TiO_2$, $Nb_2O_5$, $P_2O_5$ and F in specified percentages by weight, with the sum of the amounts of $SiO_2$, $B_2O_3$ and $P_2O_5$ between 38 and 45% by weight and the sum of the amounts of $ZrO_2$ and $TiO_2$ between 12 and 27% by weight.

11 Claims, No Drawings

OPTICAL GLASS

This invention relates to optical glass.

It is known that wave fronts are deformed in a glass if the optical path-lengths are different in different portions of the glass as a result of temperature gradients.

Optical instruments, e.g. in space vehicles, are at times subject to strong temperature differences resulting from radiation from the sun and reflection in space, besides emitted and/or reflected infra-red radiation of nearby planets. These temperature differences can cause wavefront deformation in the optical glass, said deformation considerably reducing the resolving power of the optical systems. Even in aerial photography and in laser technology, the temperature gradients arising there can lead to considerable wavefront deformation.

There is therefore a great interest in the provision of optical systems and components made of glass with an optical path length independent of temperature.

In plane parallel lenses or plane parallel laser rods, the change in optical path length resulting from a change in temperature is:

$$\Delta W = W_1 - W_2 = dx \left( \alpha(n-1) + \frac{dn}{dt} \right) x \Delta t,$$

in which:
 $d$ = thickness of the glass,
 $n$ = refractive index of the glass,
 $\alpha$ = coefficient of thermal expansion, and
 $t$ = temperature.

A wavefront deformation is causes if $\Delta w$ is of different values at different portions of the optical component as a result of temperature gradients. From the above equation it can be seen that the optical path difference $\Delta W$ may be reduced by reducing the thickness $d$ of the glass element component, the temperature difference $\Delta t$ or the value $G = (n-1)\alpha + dn/dt$. The value $G$ is only dependent on the physical properties of the glass and should be as small as possible, O ideally.

The value of $dn/dt$ is dependent on the summation of two components:

1. The volumetric expansion of the glass resulting from an increase in temperature causes a change towards small refractive indices, i.e. a negative $dn/dt$ value.

2. The ultra-violet eigenfrequency $\lambda_o$ of the glass is moved to greater wave lengths by an increase in temperature and as a result the refractive index is increased (positive $dn/dt$ values).

In most glass the second influence is predominant, i.e. the $dn/dt$ values are positive.

In order to obtain negative $dn/dt$ values, components must be incorporated in the glass which:
 a. keep the temperature dependence of the ultraviolet eigenfrequency $d\lambda_o/dt$ as small as possible and-/or
 b. effect movement of the ultra-violet eigenfrequency $\lambda_o$ to small wave lengths.

According to the coefficient of thermal expansion $\alpha$ is implicitly contained in the $dn/dt$ value and there is accordingly a requirement for a high coefficient of thermal expansion $\alpha$. According to the requirement that $G = (n-1) \times \alpha + dn/dt = 0$ on the other hand a $\alpha$ value which is as small as possible is desirable. This contrast shows the difficulties which arise in the development of glass with an optical path length that is independent of temperature.

It was found that the athermal wave aberration is not determined only by $G$ but that the refractive index gradient resulting from thermal expansion, $\sigma$ W, also determines the wave aberration. Therefore, the "classis G-value" must be supplemented by a value $$\frac{\delta n}{\delta \sigma} \times \frac{d\sigma}{dt}$$

so that complete athermality may be achieved. This value can be kept low if $\alpha$, the modulus of elasticity and $\delta n/\delta \sigma$ of the glass are low. Generally $$\frac{\delta n}{\delta \sigma} \times \frac{d\sigma}{dt}$$

is positive so that, because of compensation, the "classic G-value" should be negative. The requirement for the "classic G-value" is thus nil or negative.

No flint glass in the optical property range $n_e$ 1.58 to 1.67, and $v_e$ <44 to 30, has previously been known which fulfils these conditions.

It is an object of the present invention to provide compositions for glass with low v-values ($v_e < 44$) (flint glass), in which the effects of a temperature gradient on the optical properties of the glass are minimized.

This object is achieved according to the invention with a glass which includes the following components in percentages by weight:

| | |
|---|---|
| $SiO_2$ | 6 to 25, |
| $B_2O_3$ | 15 to 36, |
| $K_2O$ | 13 to 21, |
| BaO | 6 to 30, |
| $ZrO_2$ | 4 to 17, |
| $TiO_2$ | 6 to 10, |
| $Nb_2O_5$ | 4 to 20, |
| $P_2O_5$ | 0 to 12, and |
| F | 6 to 12, | wherein the sum of the amounts of $SiO_2$, $B_2O_3$ and $P_2O_5$ is between 38 and 45 weight %, the sum of the amounts of $ZrO_2$ and $TiO_2$ is between 12 and 27 weight %. In addition to the said oxides, the glass may include up to 7 weight % ZnO, up to 5 weight % CdO, PbO and/or up to 10% $Y_2O_3$ and/or 5 weight % of 3-valent oxides, such as $La_2O_3$, $Al_2O_3$, $Sb_2O_3$, and $Bi_2O_3$, and of $WO_3$, which can be used for adjusting the optical properties and for stabilization of crystallization of the glass without the value:

$$Ge_{abs} \times 10^6/^\circ C. = 2.5$$

being exceeded and without the coefficient of expansion $\alpha \times 10^7/^\circ$ C. in the temperature range of $-30^\circ$ C. to $70^\circ$ C. increasing above 120.

With the compositions according to the invention, a glass may be obtained with which the $Ge_{abs} \times 10^6$ value $= 0$. It has been found that the favorable effects of boric acid and fluorine on the eigen frequency $\lambda_o$ are best retained, i.e. the athermal properties are not disadvantageously changed if $ZrO_2$, $TiO_2$ and $Nb_2O_5$ are added in the stated amounts as shown in the following examples:

| Example 1 | | | |
|---|---|---|---|
| $SiO_2$ | 16.3 weight % | $n_e$ | = 1.5884 |
| $B_2O_3$ | 25.8 weight % | $v_e$ | = 39.90 |
| $K_2O$ | 20.6 weight % | specific gravity s | = 2.895 |
| BaO | 9.8 weight % | $\alpha \times 10^7/°C$ −30 to 70° C. | = 113 |
| $ZrO_2$ | 14.0 weight % | | |
| $TiO_2$ | 8.8 weight % | $T_g$ ° C. | = 392 |
| $Nb_2O_5$ | 4.7 weight % | $\frac{dn_e}{dt_{abs}} \times 10^6/°C$ | = −6.6 |
| F | 12.0 weight % | $Ge_{abs} \times 10^6/°C$ | = 0 |
| | | modulus of elasticity [kp/mm²] | = 5343 |
| | | Poisson's ratio | = 0.269 |

Partial exchange of $ZrO_2$ by $Nb_2O_5$ is possible for achieving still lower $v_e$ values without the Ge-value increasing as shown in Example 2:

| Example 2 | | | |
|---|---|---|---|
| $SiO_2$ | 16.3 weight % | $n_e$ | = 1.61450 |
| $B_2O_3$ | 25.8 weight % | $v_e$ | = 36.31 |
| $K_2O$ | 20.6 weight % | s | = 2.88 |
| BaO | 9.8 weight % | $\alpha \times 10^7/°C$ −30 to 70° C. | = 110.7 |
| $ZrO_2$ | 4.0 weight % | | |
| $TiO_2$ | 8.8 weight % | $T_g$ ° C. | = 448 |
| $Nb_2O_5$ | 14.7 weight % | $\frac{dn_e}{dt_{abs}} \times 10^6/°C$ | = −6.7 |
| F | 12.0 weight % | $Ge_{abs} \times 10^6/°C$ | = 0.1 |
| | | modulus of elasticity [kp/mm²] | = 5708 |

With further replacement of $Nb_2O_5$ by BaO the Ge-value rises unexpectedly with a decreasing coefficient of expansion as shown in Example 3:

| Example 3 | | | |
|---|---|---|---|
| $SiO_2$ | 16.3 weight % | $n_e$ | = 1.61527 |
| $B_2O_3$ | 25.8 weight % | $v_e$ | = 39.85 |
| $K_2O$ | 20.6 weight % | s | = 2.983 |
| BaO | 14.8 weight % | $\alpha \times 10^7/°C$ −30 to 70° C. | = 100.2 |
| $ZrO_2$ | 9.0 weight % | | |
| $TiO_2$ | 8.8 weight % | $T_g$ ° C. | = 434 |
| $Nb_2O_5$ | 4.7 weight % | $\frac{dn_e}{dt_{abs}} \times 10^6/°C$ | = −4.2 |
| F | 12.0 weight % | $Ge_{abs} \times 10^6/°C$ | = +2.0 |

Inserting $Na_2O$ or $Li_2O$ instead of $K_2O$ is possible in small amounts <2 %, but unfavourable in larger proportions because the coefficient of expansion is very sharply increased. The more ready vaporization of the alkali components in the presence of fluorine adversely affects production of the glass because of selective surface vaporization which cause a lack of homogeneity.

With rising BaO content and decreasing fluorine content the coefficient of expansion becomes smaller, the refractive index increases and the Ge-value increases to +1.2, as shown in Example 4:

| Example 4 | | | |
|---|---|---|---|
| $SiO_2$ | 12.3 weight % | $n_e$ | = 1.60635 |
| $B_2O_3$ | 29.8 weight % | $v_e$ | = 42.60 |
| $K_2O$ | 20.6 weight % | $\alpha \times 10^7/°C$ −30 to 70° C. | = 103.3 |
| BaO | 19.8 weight % | | |
| $ZrO_2$ | 4.0 weight % | $\frac{dn_e}{dt_{abs}} \times 10^6/°C$ | = −5 |
| $TiO_2$ | 8.8 weight % | $Ge_{abs} \times 10^6/°C$ | = +1.2 |
| $Nb_2O_5$ | 4.7 weight % | | |
| F | 5.0 weight % | | |

The sum of the components BaO, $ZrO_2$, $TiO_2$ and $Nb_2O_5$ amounts to between 32 and 45 weight %, so that the fluorine proportion is ≦ 5.0 weight %. BaO can be replaced by SrO up to 20 weight % and by MgO up to 5 weight %. Care should, however, then be taken to ensure that the $K_2O$ content is not smaller than 13%, so that a Ge-value of + 2.5 × $10^{-6}$/° C. is not exceeded. Ge-values <O can be achieved by further exchange of $SiO_2$ by $B_2O_3$ and inclusion of $Al_2O_3$, see Examples 5 and 6, but then the tendency to crystallize is increased so strongly that larger objective components (300 mm. $\phi$, 60 mm. thickness) cannot be produced. Compositions which are stable to crystallization have Ge-values between 0.5 and 1.2 × $10^{-6}$/° C. (see Examples 4 and 7). The chemical resistance of the glass decreases with increasing BaO content. The compositions with BaO content ≦ 20 weight % are especially favorable.

The invention is illustrated in more detail by the following examples:

| Example 5 | | | |
|---|---|---|---|
| $SiO_2$ | 8.0 weight % | $n_e$ | = 1.61525 |
| $B_2O_3$ | 34.1 weight % | $v_e$ | = 34.88 |
| $K_2O$ | 20.6 weight % | $\alpha \times 10^7/°C$ −30 to 70° C. | = 116.1 |
| BaO | 9.8 weight % | | |
| $TiO_2$ | 8.8 weight % | $\frac{dn_e}{dt_{abs}} \times 10^6/°C$ | = −8.1 |
| $ZrO_2$ | 4.0 weight % | $Ge_{abs} \times 10^6/°C$ | = −0.9 |
| $Nb_2O_5$ | 14.70 weight % | | |
| F | 12.0 weight % | | |

| Example 6 | | | |
|---|---|---|---|
| $SiO_2$ | 16.3 weight % | $n_e$ | = 1.58746 |
| $B_2O_3$ | 25.9 weight % | $v_e$ | = 37.11 |
| $K_2O$ | 20.7 weight % | $\alpha \times 10^7/°C$ −30 to 70° C. | = 116.2 |
| BaO | 9.8 weight % | | |
| $Al_2O_3$ | 4.5 weight % | $\frac{dn_e}{dt_{abs}} \times 10^6/°C$ | = −7.6 |
| $TiO_2$ | 8.8 weight % | $Ge_{abs} \times 10^6/°C$ | = −0.7 |
| $ZrO_2$ | 4.0 weight % | | |
| $Nb_2O_5$ | 10.0 weight % | | |
| F | 12.0 weight % | | |

| Example 7 | | | |
|---|---|---|---|
| $SiO_2$ | 16.3 weight % | $n_e$ | = 1.60384 |
| $B_2O_3$ | 25.7 weight % | $v_e$ | = 39.42 |
| $K_2O$ | 20.7 weight % | $\alpha \times 10^7/°C$ −30 to 70° C. | = 109.3 |
| BaO | 14.8 weight % | | |
| $TiO_2$ | 8.8 weight % | $\frac{dn_e}{dt_{abs}} \times 10^6/°C$ | = −6.1 |
| $ZrO_2$ | 4.0 weight % | $Ge_{abs} \times 10^6/°C$ | = +0.5 |
| $Nb_2O_5$ | 9.7 weight % | | |
| F | 12.0 weight % | modulus of elasticity [kp/mm²] | = 5989 |

-continued

| | |
|---|---|
| Poisson's ratio | = 0.267 |

The compositions of the glass according to the invention lie in the following area:

| Oxides | Weight % |
|---|---|
| $SiO_2$ | 6 to 25 |
| $B_2O_3$ | 15 to 36 |
| $P_2O_5$ | 0 to 12 |
| $K_2O$ | 13 to 21 |
| BaO | 6 to 30 |
| $ZrO_2$ | 4 to 17 |
| $TiO_2$ | 6 to 10 |
| $Nb_2O_5$ | 4 to 20 |
| F | 5 to 12 |
| ZnO | 0 to 7 |
| PbO | 0 to 5 |
| $Al_2O_3$ | 0 to 5 |
| $La_2O_3$ | 0 to 5 |
| $Bi_2O_3$ | 0 to 5 |
| $Sb_2O_3$ | 0 to 5 |
| $WO_3$ | 0 to 5 |
| $Y_2O_3$ | 0 to 10 |
| $Ta_2O_5$ | 0 to 10 | wherein ZnO, PbO, $Al_2O_3$, $La_2O_3$, $Bi_2O_3$, $Y_2O_3$ ($Gd_2O_3$), $Sb_2O_3$, $Ta_2O_5$, $WO_3$ can be added to obtain desired optical properties and to stabilize crystallization without the $Ge_{abs} \times 10^6/°C$. —value exceeding 2.5.

BaO can be replaced by SrO up to 15%, by CaO up to 8%, by MgO up to 5% and $Nb_2O_5$ can be replaced by $Ta_2O_5$ up to 10 weight %, if it is necessary to stabilize crystallization.

The proportions of fluorine in the said compositions generally act as a purifying means. However, $As_2O_3$ as well as $Sb_2O_3$ may be used as an additional purifying means. The fluorine replaces corresponding proportions of oxygen and is normally added as potassium fluoride or potassium bifluoride. Fluorine can, however, also be added as $BaF_2$ or as a fluoride of any of the other metals.

The addition of $Li_2O$ and $Na_2O$ in small amounts offers no special advantages other than that, as expected, the coefficient of expansion increases.

The glass according to the invention from this composition range fulfils the following conditions besides those already mentioned:

The coefficient of expansion $\alpha \cdot 10^7/°C$.
−30 to 70° C.

is smaller than 120.

A glass with a $Ge_{abs} \cdot 10^6/°C$.—value > 0.5 is distinguished by especially high stability of crystallization which facilitates production of large-size optical components (minimum dimensions of 300 mm. $\phi$, thickness 60 mm.).

The glass according to the invention has a good chemical resistance because of its high proportions of $TiO_2$, $ZrO_2$ and $Nb_2O_5$.

The glass according to the invention has a positive relative partial dispersion $$\frac{n_g - n_F}{n_F - n_C} = P_gF$$

comparable with conventional flint glass of similar or the same optical properties (Table 3).

In Table 1 the said and other examples of composition are assembled and in Table 2 the corresponding physical properties are set out.

Production of a 6 l. melt $n_e = 1.60635$  $v_e = 42.60$
$\alpha \times 10^7/°C. = 103.3$  $Ge_{abs} \times 10^6/°C. = 1.23$

| Composition | | Weight of Material | |
|---|---|---|---|
| Oxides | Weight % | Raw Materials | kg. |
| $SiO_{2tot}$ | 12.31 | $SiO_2$ | 4.932 |
| $B_2O_3$ | 29.88 | $H_3BO_3$ | 21.153 |
| BaO | 5.76 | $Ba(NO_3)_2$ | 3.948 |
| BaO | 14.00 | $BaCO_3$ | 7.164 |
| $K_2O$ | 14.36 | $KNO_3$ | 8.447 |
| $K_2O$ | 6.20 | $KHF_2$ | 4.126 |
| $TiO_2$ | 8.84 | $TiO_2$ | 3.552 |
| $ZrO_2$ | 3.98 | $ZrO_2$ | 1.603 |
| $Nb_2O_5$ | 4.67 | $Nb_2O_5$ | 1.871 |
| F | 5.00 | | |

The well-mixed batch is introduced into a platinum melting pot and heated at 1160° to 1220° C. for about 8 hours; it is then purified for 2 hours at 1280° C. and for 1 hour at 1100° C. It is then stirred for 1½ hours while cooling from 1100° C. to 920° C. and allowed to run off in pre-heated shapes.

The glass blocks are cooled from 450° C. as desired at a rate of 6° C./ hour or more slowly.

Table 1

| Oxides | 1 | 2 | 3 | 4 | 5 | 6 | 7 | 8 | 9 | 10 | 11 | 12 |
|---|---|---|---|---|---|---|---|---|---|---|---|---|
| $SiO_2$ | 16,3 | 16,3 | 16,3 | 12,3 | 8,0 | 16,3 | 16,3 | 6,3 | 9,3 | 16,3 | 16,3 | 16,3 |
| $B_2O_3$ | 25,8 | 25,8 | 25,8 | 29,8 | 34,1 | 25,9 | 25,7 | 35,8 | 32,8 | 25,9 | 25,9 | 25,8 |
| $P_2O_5$ | — | — | — | — | — | — | — | — | — | — | — | — |
| $K_2O$ | 20,6 | 20,6 | 20,6 | 20,6 | 20,6 | 20,7 | 20,7 | 20,6 | 20,6 | 20,7 | 20,7 | 14,6 |
| BaO | 9,8 | 9,8 | 14,8 | 19,8 | 9,8 | 9,8 | 14,8 | 9,8 | 14,8 | 9,8 | 9,8 | 25,7 |
| ZnO | — | — | — | — | — | — | — | — | — | — | — | — |
| PbO | — | — | — | — | — | — | — | — | — | — | — | — |
| $Al_2O_3$ | — | — | — | — | — | 4,5 | — | — | — | — | — | — |
| $La_2O_3$ | — | — | — | — | — | — | — | — | — | 4,5 | — | — |
| $Y_2O_3$ | — | — | — | — | — | — | — | — | — | — | — | — |
| $ZrO_2$ | 14,0 | 4,0 | 9,0 | 4,0 | 4,0 | 4,0 | 4,0 | 4,0 | 14,0 | 4,0 | 4,0 | 4,0 |
| $TiO_2$ | 8,8 | 8,8 | 8,8 | 8,8 | 8,8 | 8,8 | 8,8 | 8,8 | 8,8 | 8,8 | 8,8 | 8,8 |
| $Ta_2O_5$ | — | — | — | — | — | — | — | — | — | — | 4,5 | — |
| $Nb_2O_5$ | 4,7 | 14,7 | 4,7 | 4,7 | 14,7 | 10,0 | 9,7 | 4,7 | 9,7 | 10,0 | 10,0 | 4,8 |
| F | 12,0 | 12,0 | 12,0 | 5,0 | 12,0 | 12,0 | 12,0 | 12,0 | 6,0 | 8,0 | 12,0 | 12,0· |

| Oxides | 13 | 14 | 15 | 16 | 17 | 18 | 19 |
|---|---|---|---|---|---|---|---|
| $SiO_2$ | 16,3 | 16,2 | 16,3 | 15,2 | 16,3 | 23,0 | 16,3 |
| $B_2O_3$ | 25,8 | 25,7 | 25,7 | 24,2 | 25,9 | 18,6 | 15,0 |
| $P_2O_5$ | — | — | — | — | — | — | 10,8 |
| $K_2O$ | 20,6 | 14,2 | 20,7 | 19,3 | 16,6 | 20,4 | 20,6 |
| BaO | 8,8 | 16,0 | 7,3 | 9,2 | 14,8 | 20,6 | 9,8 |
| ZnO | — | — | — | 6,8 | — | — | — |

Table 1-continued

| | | | | | | | |
|---|---|---|---|---|---|---|---|
| PbO | — | — | — | — | 4,0 | — | — |
| $Al_2O_3$ | — | — | — | — | — | — | — |
| $La_2O_3$ | — | — | — | — | — | — | — |
| $Y_2O_3$ | 6,0 | — | — | — | — | — | — |
| $ZrO_2$ | 4,0 | 4,4 | 16,5 | 4,0 | 4,0 | 4,0 | 4,0 |
| $TiO_2$ | 8,8 | 8,8 | 8,8 | 8,2 | 8,8 | 8,8 | 8,8 |
| $Ta_2O_5$ | — | — | — | — | — | — | — |
| $Nb_2O_5$ | 9,7 | 14,7 | 4,7 | 13,7 | 9,6 | 4,6 | 14,7 |
| F | 12,0 | 12,0 | 12,0 | 12,0 | 12,0 | 12,0 | 12,0 |

Table 2

| Physical Properties | 1 | 2 | 3 | 4 | 5 | 6 | 7 | 8 | 9 |
|---|---|---|---|---|---|---|---|---|---|
| $n_e$ | 1,58842 | 1,61450 | 1,61527 | 1,60381 | 1,61525 | 1,58746 | 1,60384 | 1,59657 | 1,61386 |
| $v_e$ | 39,7 | 35,7 | 39,9 | 43,0 | 34,9 | 37,1 | 39,4 | 38,3 | 39,4 |
| s | 2,845 | 2,882 | 2,983 | 2,962 | 2,839 | 2,779 | 2,942 | 2,810 | 2,877 |
| $\alpha \cdot 10^7/°C$ −10 bis + 70° C | 113,3 | 110,7 | 100,2 | 104,4 | 110,0 | 116,2 | 109,3 | 118,2 | 108,4 |
| $Tg° C$ | 392 | 399 | 434 | 443 | 375 | 381 | 421 | 389 | 428 |
| $\frac{dn_e}{dt_{abs}} \cdot 10^6/°C$ | −6,6 | −6,7 | −4,2 | −5,3 | −7,4 | −7,6 | −6,1 | −7,5 | −5,5 |
| $Ge_{abs} \cdot 10^6/°C$ | ±0 | +0,1 | +2,0 | +1,0 | −0,7 | −0,7 | +0,5 | −0,5 | +1,2 |

| Physical Properties | 10 | 11 | 12 | 13 | 14 | 15 | 16 | 17 | 18 | 19 |
|---|---|---|---|---|---|---|---|---|---|---|
| $n_e$ | 1,61657 | 1,60773 | 1,60877 | 1,61376 | 1,65105 | 1,60720 | 1,63323 | 1,61129 | 1,59532 | 1,63595 |
| $v_e$ | 38,9 | 38,0 | 42,4 | 39,3 | 34,5 | 38,5 | 36,4 | 38,6 | 44,1 | 34,9 |
| s | 2,926 | 2,916 | 3,13 | 2,898 | 3,059 | 2,862 | 3,002 | 3,002 | 3,047 | 2,980 |
| $\alpha \cdot 10^7/°C$ −10 bis +70° C | 105,5 | 110,9 | 101,6 | 102,4 | 92,1 | 103,9 | 99,9 | 109,2 | 105,9 | 110,0 |
| $Tg° C$ | 437 | 406 | 438 | 442 | 444 | 416 | 421 | 413 | 456 | 454 |
| $\frac{dn_e}{dt_{abs}} \cdot 10^6/°C$ | −4,8 | −5,8 | −5,1 | −4,1 | −3,5 | −4,9 | −3,2 | −5,8 | −5,0 | −5,5 |
| $Ge_{abs} \cdot 10^6/°C$ | +1,7 | +0,9 | +1,1 | +2,2 | +2,5 | +1,4 | +2,5 | +0,9 | +1,3 | +1,5 |

Table 3

| Type | (Example) | $n_d$ | $v_d$ | PgF | $\frac{dn_e}{dt_{abs}} \times 10^6/°C$ | $Ge_{abs} \times 10^6/°C$ |
|---|---|---|---|---|---|---|
| F 5 | | 1,603420 | 38,03 | 0,5790 | +3,3 | +8,1 |
| F 8 | | 1,595510 | 39,18 | 0,5772 | +3,3 | +8,2 |
| | (15) | 1,60182 | 38,65 | 0,5868 | −4,9 | +1,4 |
| TiF 5 | | 1,59355 | 35,51 | 0,5928 | −1,2 | +4,2 |
| | (2) | 1,60809 | 36,41 | 0,5936 | −6,7 | +0,1 |
| LF 2 | | 1,58921 | 40,94 | 0,5746 | +0,9 | +6,2 |
| LF 5 | | 1,581440 | 40,85 | 0,5745 | +1,5 | +6,79 |
| | (1) | 1,58479 | 40,14 | 0,5845 | −6,6 | 0 |
| F 8 | | 1,59551 | 39,18 | 0,5772 | +3,3 | +8,2 |
| | (7) | 1,60020 | 39,67 | 0.5844 | −6,1 | +0,5 |
| BaSF 3 | | 1,60717 | 40,29 | 0,5762 | +3,0 | +7,8 |
| | (3) | 1,61156 | 40,15 | 0,5807 | −4,2 | +2,0 |

1. Optical flint glass with a path length substantially independent of temperature in the range $n_e$ 1.58 to 1,66, $v_e$ 44 to 30, the value $Ge_{abs} \times 10^6/°C$. not exceeding 2.5 and the coefficient of thermal expansion $\alpha \times 10^7/°C$. in the temperature range of −30° C. to 70° C. not being above 120, said glass consisting essentially of the following components in weight %:

| | |
|---|---|
| $SiO_2$ | 6 to 25 |
| $B_2O_3$ | 15 to 36 |
| $K_2O$ | 13 to 21 |
| BaO | 6 to 30 |
| $ZrO_2$ | 4 to 17 |
| $TiO_2$ | 6 to 10 |
| $Nb_2O_5$ | 4 to 20 |
| $P_2O_5$ | 0 to 12 |
| F | 5 to 12 |
| ZnO | 0 to 7 |
| PbO | 0 to 5 |
| $Al_2O_3$ | 0 to 5 |
| $La_2O_3$ | 0 to 5 |
| $Bi_2O_3$ | 0 to 5 |
| $Sb_2O_3$ | 0 to 5 |
| $WO_3$ | 0 to 5 |
| $Y_2O_3$ | 0 to 10 |
| $Ta_2O_5$ | 0 to 10, | wherein said F replaces corresponding proportions of oxygen, wherein the sum of the amounts of $SiO_2$, $B_2O_3$ and $P_2O_5$ is between 38 and 45 weight % and the sum of the amounts of $ZrO_2$ and $TiO_2$ is between 12 and 27 weight %, and wherein ZnO, PbO, $Al_2O_3$, $La_2O_3$, $Bi_2O_3$, $Y_2O_3$, $Gd_2O_3$, $Sb_2O_3$, $Ta_2O_5$, $WO_3$ can be added to obtain desired optical properties and to stabilize crystallization without the $Ge_{abs} \times 10^6/°C$. —value exceeding 2.5, BaO can be replaced by SrO up to 15%, by CaO up to 8%, by MgO up to 5% and $Nb_2O_5$ can be replaced by $Ta_2O_5$ up to 10 weight %, and wherein $K_2O$ can be replaced by $Na_2O$ or $Li_2O$ by up to 2 weight %.

2. Optical glass according to claim 1, which consists essentially of:

| | |
|---|---|
| $SiO_2$ | 16.3 weight % |
| $B_2O_3$ | 25.8 weight % |
| $K_2O$ | 20.6 weight % |
| BaO | 9.8 weight % |
| $ZrO_2$ | 14.0 weight % |
| $TiO_2$ | 8.8 weight % |
| $Nb_2O_5$ | 4.7 weight % |
| F | 12.0 weight % | said glass having the following properties:

| | |
|---|---|
| $n_e$ | = 1.5884 |
| $v_e$ | = 39.90 |
| specific gravity s | = 2,895 |
| $\alpha \times 10^7/°C$, −30 to 70° C. | = 113 |
| $Tg° C.$ | = 392 |
| $\frac{dn_e}{dt_{abs}} \times 10^6/°C$ | = −6.6 |
| $Ge_{abs} \times 10^6/°C$ | = 0 |
| modulus of elasticity $[kp/mm^2]$ | = 5343 |
| Poisson's ratio | = 0.269. |

3. Optical glass according to claim 1, which glass consists essentially of:

| | |
|---|---|
| $SiO_2$ | 16.3 weight % |
| $B_2O_3$ | 25.8 weight % |
| $K_2O$ | 20.6 weight % |
| BaO | 9.8 weight % |
| $ZrO_2$ | 4.0 weight % |
| $TiO_2$ | 8.8 weight % |
| $Nb_2O_5$ | 14.7 weight % |
| F | 12.0 weight % | said glass having the following properties:

| | |
|---|---|
| $n_e$ | = 1.61450 |
| $v_e$ | = 36.31 |
| $\alpha \times 10^7/°C$, −30 to 70° C. | = 110.7 |
| $Tg° C.$ | = 448 |
| $\frac{dn_e}{dt_{abs}} \times 10^6/°C$ | = −6.7 |
| $Ge_{abs} \times 10^6/°C$ | = +0.1 |
| modulus of elasticity $[kp/mm^2]$ | = 5708. |

4. Optical glass according to claim 1, which glass consists essentially of:

| | |
|---|---|
| $SiO_2$ | 16.3 weight % |
| $B_2O_3$ | 25.8 weight % |
| $K_2O$ | 20.6 weight % |
| BaO | 14.8 weight % |
| $ZrO_2$ | 9.0 weight % |
| $TiO_2$ | 8.8 weight % |
| $Nb_2O_5$ | 4.7 weight % |
| F | 12.0 weight % | and which has the following properties:

| | |
|---|---|
| $n_e$ | = 1.61527 |
| $v_e$ | = 39.85 |
| s | = 2.983 |
| $\alpha \times 10^7/°C$, −30 to 70° C. | = 100.2 |
| $Tg° C.$ | = 434 |
| $\frac{dn_e}{dt_{abs}} \times 10^6/°C$ | = −4.2 |
| $Ge_{abs} \times 10^6/°C$ | = +2.0. |

5. Optical glass according to claim 1, which glass consists essentially of:

| | |
|---|---|
| $SiO_2$ | 12.3 weight % |
| $B_2O_3$ | 29.8 weight % |
| $K_2O$ | 20.6 weight % |
| BaO | 19.8 weight % |
| $ZrO_2$ | 4.0 weight % |
| $TiO_2$ | 8.8 weight % |
| $Nb_2O_5$ | 4.7 weight % |
| F | 5.0 weight % | and which has the following properties:

| | |
|---|---|
| $n_e$ | = 1.60653 |
| $v_e$ | = 42.60 |
| $\alpha \times 10^7/°C$, −30 to 70° C. | = 103.3 |
| $\frac{dn_e}{dt_{abs}} \times 10^6/°C$ | = −5 |
| $Ge_{abs} \times 10^6/°C$ | = +1.2. |

6. Optical glass according to claim 1 stable to crystallization and having a Ge value above $+0.5 \times 10^6/°C$.

7. Optical glass according to claim 1 having a sufficiently high percentage of $B_2O_3$ replacing $SiO_2$ and/or the inclusion of $Al_2O_3$ to yield a Ge value less than 0.

8. Optical glass according to claim 7 containing $Al_2O_3$.

9. Optical glass according to claim 7 containing none of SrO, CaO or MgO.

10. Optical glass according to claim 7 containing none of $Li_2O$ or $Na_2O$.

11. Optical glass according to claim 7 containing none of $P_2O_5$, ZnO, PbO, $Al_2O_3$, $La_2O_3$, $Bi_2O_3$, $Sb_2O_3$, $WO_3$, $Y_2O_3$ or $Ta_2O_5$.

* * * * *